United States Patent [19]
Ooura et al.

[11] Patent Number: 6,022,932
[45] Date of Patent: Feb. 8, 2000

[54] PROCESS FOR PRODUCING VINYL CHLORIDE POLYMER, WITH IRON CHELATES IN COATED VESSEL

[75] Inventors: Makoto Ooura, Ibaraki-ken; Kaname Inoue, Kawasaki; Masakuni Yamamoto, Kashiwa; Tadashi Amano, Ibaraki-ken, all of Japan

[73] Assignee: Shin-Etsu Chemical Co., Ltd., Tokyo, Japan

[21] Appl. No.: 08/848,196

[22] Filed: Apr. 29, 1997

[30] Foreign Application Priority Data

Apr. 30, 1996 [JP] Japan ................................ 8-132638
Jul. 31, 1996 [JP] Japan ................................ 8-218042

[51] Int. Cl.[7] ........................................................ C08F 2/20
[52] U.S. Cl. ............................................. 526/62; 526/93
[58] Field of Search ............................................. 526/62

[56] References Cited

U.S. PATENT DOCUMENTS

| | | | |
|---|---|---|---|
| 3,953,398 | 4/1976 | Kline | 524/291 |
| 5,201,945 | 4/1993 | Shimizu et al. | |
| 5,691,428 | 11/1997 | Shimizu | 526/62 |
| 5,728,781 | 3/1998 | Usuki | 526/62 |

FOREIGN PATENT DOCUMENTS

| | | |
|---|---|---|
| 0 126 991 | 12/1984 | European Pat. Off. . |
| 0 695 761 | 2/1996 | European Pat. Off. . |
| 1536160 | 12/1978 | United Kingdom . |

OTHER PUBLICATIONS

Chemical Abstracts, AN 88:51507, JP 52–087491, Jul. 21, 1977.

*Primary Examiner*—Christopher Henderson
*Attorney, Agent, or Firm*—Oblon, Spivak, McClelland, Maier & Neustadt, P.C.

[57] ABSTRACT

In a process for producing vinyl chloride polymers including polymerization of vinyl chloride or a monomer mixture containing it in an aqueous medium using a polymerization initiator, the polymerization is carried out in the presence of a chelating agent, The chelating agent is capable of chelating iron (II) and iron (III). This process makes it possible to prevent polymer scales from adhering to, e.g. baffle surfaces facing inner walls of the polymerization vessel, which has been hitherto difficult to do so, and less cause initial discoloration of polymer products to improve quality. It is more effective to use a polymerization vessel previously provided with coating films of a polymer scale preventive agent on the inner walls of the polymerization vessel and the other portions with which monomers come into contact in the course of polymerization.

4 Claims, 2 Drawing Sheets

PROCESS FOR PRODUCING VINYL CHLORIDE POLYMER, WITH IRON CHELATES IN COATED VESSEL

BACKGROUND OF THE INVENTION

1. Field of the Invention

This invention relates to a process for producing a vinyl chloride polymer while controlling formation of scales, and a vinyl chloride polymer obtained by such a process.

2. Description of the Prior Art

Processes in which vinyl chloride monomers or mixtures of vinyl chloride monomers and other vinyl monomers are subjected to suspension polymerization or emulsion polymerization in aqueous mediums in the presence of polymerization catalysts have the problems that polymers in the form of scales may adhere to inner surfaces of polymerization vessels, i.e., inner walls of polymerization vessels or other fittings of polymerization vessels at their portions with which monomers come into contact in the course of polymerization, e.g., the surfaces of stirrers or the like. Adhesion of such polymer scales to the inner surfaces of polymerization vessels may cause a decrease in heat transfer efficiency of polymerization vessel walls and in polymerization yield, and also the scales adhering thereto may peel from the inner surfaces of polymerization vessels to mix in products to cause what is called fish eyes, resulting in a lowering of the quality of products. Removing such scales also takes much labor and time to bring about undesirable many disadvantages such as a decrease in operating efficiency of polymerization vessels.

Especially in the case of suspension polymerization, the scales adhering to polymerization vessels have a lower porosity (porousness) than normal polymers simultaneously produced, and hence the scales having peeled therefrom and mixed in normal polymers make the polymers poorly compatible with molding additives including plasticizers added when the polymers are molded, so that particles not mutually melt in final products in part (what is called fish eyes) may occur. Also, if the polymerization is repeated without removing the scales from polymerization vessels, the scales may accumulate to even deform the inside shapes of polymerization vessels. Especially when the scales have accumulated on stirrers in a large quantity, they may greatly affect the whole suspension system to affect the shape, particle size distribution, yield and so forth of the resulting polymer particles.

For these reasons, it is indispensable to periodically remove scales from the inner surfaces of polymerization vessels. To remove them, it is necessary to make the operation of polymerization vessels stop or pause, resulting also in an increase in the cost not directly concerned with the manufacture of polymers. The scales are commonly removed by scraping them from the inner surfaces by a mechanical means, making a high-speed water jet strike against the scales, or dissolving them with organic solvents. In some part of such operations, operators must enter the vessels to make operations, where they are involved in a possibility of touching the vinyl chloride monomers that are considered causative of cancer, which is very undesirable. Also, removing the scales from polymerization vessels by a mechanical means has a high possibility of damaging the inner surfaces, and this may undesirably promote the formation of scales in the subsequent polymerization. Besides, the method of removing the scales by the use of solvents additionally requires equipment for the recovery of solvents and cost and expenses for the driving of such equipment.

Accordingly, as methods for preventing adhesion of the polymer scales, a method is known in which the inner walls of polymerization vessels are coated with a scale preventive agent to form coating films thereon, and various scale preventive agents are proposed. For example, dyes or pigments (Japanese Patent Publication No. 45-30835), polar organic compounds (Japanese Patent Publication No. 45-30343), aromatic polyamine compounds (Japanese Unexamined Patent Publication No. 53-23381), condensates of phenol compounds with formalin or benzaldehyde (Japanese Unexamined Patent Publication No. 54-36389) and so forth are proposed as the scale preventive agents.

The coating films of these scale preventive agents are formed in the following way: A polymer slurry formed in a polymerization vessel is drawn out of it after polymerization is completed, and then the inside of the polymerization vessel is cleaned with water, followed by three steps of (1) spray-coating a polymer scale preventive agent coating solution on the inner walls of the polymerization vessel and the other portions with which vinyl monomers come into contact in the course of polymerization, from spray nozzles provided at the top of a vapor phase zone inside the polymerization vessel (a coating step), (2) drying the coating surfaces after the spray coating to obtain dried coating films (a drying step) and (3) washing the dried coating films with water (a washing step).

After coating films of the scale preventive agent are formed in this way, vinyl chloride monomers and other materials are charged into the polymerization vessel to carry out polymerization to produce vinyl chloride polymers. In recent years, in order to improve productivity, it is desired to shorten the cycling time of the process comprising a series of steps of the steps of forming the polymer scale preventive coating films and charging the materials, the step of polymerization reaction, the steps of collecting unreacted monomers and drawing out the polymer slurry and the step of washing the inside of the polymerization vessel with water. As a part of such desire, it is also desired to shorten the time taken for forming the coating films.

At the same time, a polymerization process is recently employed which makes use of a large-size polymerization vessel having a capacity of 40 m$^3$ or more for the purpose of improving productivity and also can shorten the polymerization reaction time. In such a polymerization process that can shorten the polymerization time, a method in which a polymerization initiator is used in a large amount is employed. Use of the polymerization initiator in a large amount results in an increase in heat values per unit time, and hence it becomes necessary to improve heat elimination efficiency. A heat elimination means is typified by a cooling jacket and a reflux condenser. In the case of the large-size polymerization vessel having a capacity of 40 m$^3$ or more, the jacket is insufficient for the heat elimination, and it becomes necessary to make the rate of heat elimination higher by the use of the reflux condenser. However, with an increase in the load of heat elimination by the reflux condenser, the slurry inside the polymerization vessel may more bubble and the slurry may overflow into the reflux condenser, so that the heat elimination capacity of the reflux condenser may lower or the polymer scales may adhere to the inside of the reflux condenser. In some instances, polymer particles overflowed may cause pipes to clog to make it impossible to operate the reflux condenser. Moreover, if the reflux condenser is used from the beginning of polymerization, problems may arise such that the resulting polymer particles have coarse particle size and foamy polymers are produced.

Accordingly, in the case when such a large-sized polymerization vessel is used to shorten the polymerization reaction time, the heat elimination capacity may necessarily be insufficient when only the jacket and the reflux condenser are used, and the insufficient heat elimination capacity must be compensated with any additional cooling means. As such additional cooling means, cooling devices such as a cooling coil, a draft tube and a cooling cylindrical baffle are provided in the polymerization vessel.

Now, when the coating films of the polymer scale preventive agent are formed, the spray coating that can be carried out in a good efficiency as stated above is employed. In this spray coating, however, the coating solution can not be well applied on the portions shadowed as viewed from the spray nozzles inside the polymerization vessel, e.g., the surfaces of baffles provided in the polymerization vessel, facing the inner wall of the polymerization vessel, and hence the coating may become uneven. Especially when the inside of the polymerization vessel has a complicated structure because of the internal cooling devices, the coating may become insufficient at many portions. Hence, with an increase in the number of repeating polymerization batches, the polymer scales may more adhere to the portions where no sufficient coating films are formed. As a countermeasure therefor, the coating solution is well sprayed so as to cause no uneven coating, i.e., the coating solution of the polymer scale preventive agent is applied in a large quantity over a long time in the coating step. As the result, however, the drying time required in the drying step often must be made longer with an increase in the quantity of the coating solution, and also, since the coating solution of the polymer scale preventive agent remains in a large quantity in the washing step, the washing time must be made longer in order to remove it.

To make longer the time taken for forming the coating films in this way has brought about the disadvantage that it goes against the above requirement for making the polymerization time shorter.

In addition, the use of the polymer scale preventive agent coating solution in a large quantity may bring about ill effects such that it greatly causes initial discoloration of the vinyl chloride polymer products obtained by polymerization and causes an increase in colored foreign matter ascribable to the scale preventive agent included in the products.

SUMMARY OF THE INVENTION

Accordingly, an object of the present invention is to provide a process for producing vinyl chloride polymers that can effectively prevent polymer scales from adhering to the inner surfaces of the polymerization vessel, in particular, the portions shadowed at the time of spray coating, i.e., the portions to which it has been difficult to prevent scales from adhering, e.g., the surfaces of internal cooling means such as the baffle, facing the inner walls of the polymerization vessel in its liquid phase zone, and also that does not adversely affect the product quality, as being free from initial discoloration and colored foreign matter in the vinyl chloride polymer products obtained.

To achieve the above object, the present invention provides a process for producing vinyl chloride polymers by polymerization of vinyl chloride monomers or a vinyl monomer mixture chiefly comprised of a vinyl chloride monomer in a polymerization vessel, comprising carrying out said polymerization in an aqueous medium by the aid of a polymerization initiator, wherein the polymerization is carried out in the presence of a chelating agent capable of forming a complex of iron (II) or iron (III) in an aqueous reaction mixture (a polymerization system) containing said monomers or monomer mixture.

In the process of the present invention, coating films of a polymer scale preventive agent may preferably be further formed on the inner walls of the polymerization vessel and the other portions with which the monomers come into contact in the course of polymerization.

According to the production process of the present invention, the polymer scales can be effectively prevented from adhering to not only the inner walls of the polymerization vessel but also the other portions in the polymerization vessel to which the polymer scales have ever tended to adhere because the cooling devices such as the cooling coil, the draft tube and the cooling cylindrical baffle are provided to have a complicated structure. Also, vinyl chloride polymers less causing initial discoloration and having a high quality can be obtained.

DETAILED DESCRIPTION OF THE PREFERRED EMBODIMENTS

Figure 1:
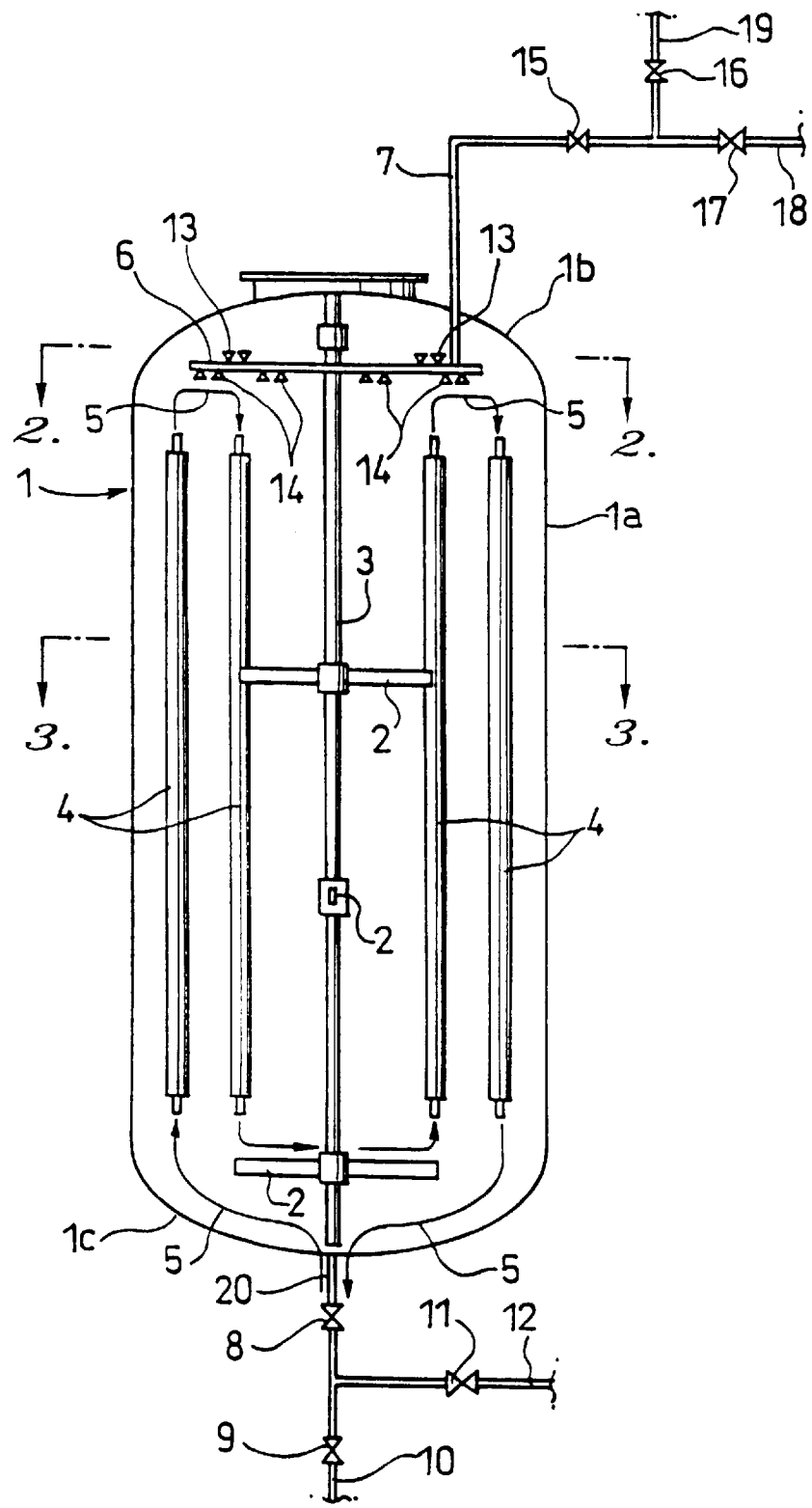
FIG. 1 is a schematic illustration of a vertical cross section of a polymerization apparatus used in Examples.

The present invention will be described below in detail.

In the process of the present invention, in a polymerization vessel, vinyl chloride monomers or a vinyl monomer mixture chiefly comprised of a vinyl chloride monomer is/are polymerized in an aqueous medium by the aid of a polymerization initiator and in the presence of a chelating agent capable of forming a complex of Fe (II) or Fe (III) in an aqueous reaction mixture (a polymerization system) containing the monomers or monomer mixture.

Monomers

As the vinyl monomers polymerized by the process for producing vinyl chloride polymers according to the present invention, vinyl chloride monomers alone may be used, and also a mixture chiefly comprised of vinyl chloride and containing other monomer copolymerizable with the vinyl chloride (usually a mixture containing 50% by weight or more of vinyl chloride). The monomer copolymerizable with vinyl chloride is exemplified by vinyl esters such as vinyl acetate and vinyl propionate, acrylates or methacrylates such as methyl acrylate or methacrylate and ethyl acrylate or methacrylate, olefins such as ethylene and propylene, maleic anhydride, acrylonitrile, styrene, vinylidene chloride, and other monomers copolymerizable with vinyl chloride.

Chelating Agent

The chelating agent is considered to react with iron oxide on the stainless steel surfaces of the wall surfaces of the polymerization vessel, in an aqueous medium to cause the iron content to dissolve out in the form of an Fe (II) complex salt or an Fe (III) complex salt, or form a stable protective complex film on the stainless steel surfaces. As the result, the redox decomposition or radical formation caused by the reaction between the metal Fe content or Fe (II) ions of the stainless steel constituting the polymerization vessel inner wall and a peroxide used as a catalyst is inhibited and furthermore the formation of scales is inhibited, as so presumed.

It is essential for the chelating agent usable in the present invention to have the ability to form a complex of Fe (II) or Fe (III) in the aqueous reaction mixture (a polymerization system) containing the vinyl chloride monomers or the vinyl monomer mixture chiefly comprised of a vinyl chloride monomer. Accordingly, the chelating agent may be water-soluble, and stated specifically may be exemplified by condensed phosphoric acid type chelating agents, aminocarboxylic acid type chelating agents and oxycarboxylic acid type chelating agents, which are preferably used.

(A) The condensed phosphoric acid type chelating agents may include, e.g.;

1) straight-chain condensed phosphoric acids represented by the general formula: $[HO(HPO_3)_nH$, n is 2 or more], such as pyrophosphoric acid, tripolyphosphoric acid and pentapolyphosphoric acid;

2) cyclic condensed phosphoric acids represented by the general formula: $[HO(HPO_3)_nH$, n is 3 or more], such as trimetaphosphoric acid, tetrametaphosphoric acid and hexametaphosphoric acid;

3) ultraphosphoric acids having a network structure, represented by the general formula: $[xH_2O.yP_2O_5$ (0<x, y<1); and 4) salts of the straight-chain condensed phosphoric acids, cyclic condensed phosphoric acids and ultraphosphoric acids as exemplified above.

The salts in the above 4) may include alkali metals such as sodium and potassium, and ammonium salts, and these may be in the any form of normal salts, acid salts (hydrogen salts), single salts and double salts, without any particular limitations.

In the case of the salts in the above 4), part or the whole of a plurality of hydrogen cations corresponding to the acid radicals may be present in the form of salts such as alkali metal salts and ammonium salts. In such an instance, the moiety of cations such as alkali metal cations or ammonium cations that form the salts may preferably be in an amount not more than 50 mol %, and more preferably not more than 30 mol %, based on the amount of phosphorus contained in the condensed phosphoric acid type chelating agents.

The condensed phosphoric acid type chelating agent may preferably have a molecular weight not less than 170, and more preferably not less than 250.

A more preferred embodiment is that the condensed phosphoric acid type chelating agent has a molecular weight not less than 170 and the cation moiety that forms the salt is contained in an amount not more than 50 mol %.

In such a preferred embodiment, the chelating ability of the condensed phosphoric acid type chelating agent is improved to bring about an improvement in scale preventive effect.

Of the condensed phosphoric acid type chelating agents exemplified above, tripolyphosphoric acid, tetrapolyphosphoric acid, trimetaphosphoric acid, tetrametaphosphoric acid and hexametaphosphoric acid are particularly preferred.

(B) The aminocarboxylic acid (amino acid) type chelating agents may include ethylenediamine-N-monoacetic acid, ethylenediamine-N,N'-diacetic acid, ethylenediamine-N,N,N',N'-tetraacetic acid, N-(2-hydroxyethyl)ethylenediamine-N,N',N'-triacetic acid, N-(2-hydroxyethyl)iminodiacetic acid, iminodiacetic acid, diethylenetriamine-N,N,N',N'',N''-pentaacetic acid, trans-1,2-cyclohexanediamine-N,N,N',N'-tetraacetic acid, 3,6-dioxa-1,8-octanediamine-N,N,N',N'-tetraacetic acid, nitrylotriacetic acid, triethylenetetramine-N,N,N',N'',N'',N''-hexaacetic acid, and alkali metal salts, ammonium salts and esters of any of these.

(c) The oxycarboxylic acid type chelating agents may include those having a carboxyl group and a hydroxyl group in one molecule, as exemplified by, but not particularly limited to, aliphatic oxycarboxylic acids such as glycolic acid, gluconic acid, lactic acid, hydroacrylic acid, α-oxybutylic acid, glyceric acid, tartronic acid, malic acid, tartaric acid and citric acid; aromatic oxycarboxylic acids such as salicylic acid, m-oxybenzoic acid, p-oxybenzoic acid, gallic acid, mandelic acid and tropic acid; and alkali metal salts, ammonium salts and esters of any of these. As these oxycarboxylic acids, those having asymmetric carbon atoms may be any of D-form, L-form and DL-form.

Of the above oxycarboxylic acids, polycarboxylic acid type oxycarboxylic acids (having two or more carboxylic acid groups in one molecule) such as tartronic acid, malic acid, tartaric acid and citric acid may preferably be used.

The chelating agents exemplified above may each be used alone or in the form of a mixture of two or more.

Of the chelating agents exemplified above, it is preferable to use the condensed phosphoric acid type chelating agents.

In the present invention, the chelating agent may be added in the polymerization system in an amount of from 10 ppm to 1,000 ppm, more preferably from 50 ppm to 500 ppm, and particularly preferably from 50 ppm to 200 ppm, based on the weight of the monomers to be charged. If the chelating agent is added in a too small amount, no sufficient scale preventive effect can be obtained, and if it is in a too large amount, there is a possibility that the resulting vinyl chloride polymers have a broad particle size distribution, as being disadvantageous.

Production Process

The chelating agent is usually added to charge materials before the polymerization is initiated.

Other polymerization conditions may be, as briefly described below, the same as those conventionally used when vinyl chloride polymers are produced by polymerization in an aqueous medium.

As the polymerization initiator, an oil-soluble polymerization initiator or a water-soluble polymerization initiator may be used. The oil-soluble polymerization initiator may include, e.g., percabonates such as diisopropyl peroxydicarbonate, di-2-ethylhexyl peroxydicarbonate and diethoxyethyl peroxydicarbonate; peresters such as t-butyl peroxyneodecanate, α-cumyl peroxyneodecanate and t-butyl peroxyneodecanate; peroxides such as acetylcyclohexylsulfonyl peroxide and 2,4,4-trimethylpentyl-2-peroxyphenoxyacetate; and azo compounds such as azobis-2,4-dimethylvaleronitrile and azobis-(4-methoxy-2,4-dimethylvaleronitrile. The water-soluble polymerization initiator may include, e.g., potassium persulfate, ammonium persulfate and hydrogen peroxide. These polymerization initiators exemplified here may each be used alone or in combination of two or more.

The polymerization initiator may be added while water or monomers are charged or after they have been charged. Alternatively, it may be previously uniformly mixed in monomers so that it can be charged together with the monomers. Still alternatively, it may be charged together with the aqueous medium in the form of an aqueous emulsion.

Any of these polymerization initiators are preferable when used in an amount of from 0.01 part by weight to 0.2 part by weight based on 100 parts by weight of the monomers to be charged.

As a dispersion stabilizer, those conventionally used in the polymerization of vinyl chloride monomers may be used, specifically including water-soluble starch type ethers; water-soluble polymers such as acrylic polymers (e.g., polyacrylic acid), gelatin, partially saponified polyvinyl alcohols, and cellulose ethers; oil-soluble partially saponified polyvinyl alcohols; oil-soluble emulsifiers such as sorbitan monolaurate, sorbitan triolate, sorbitan monostearate, glycerol tristearate, and an ethylene oxide-propylene oxide block copolymer; water-soluble emulsifiers such as polyoxyethylene sorbitan monolaurate, polyoxyethylene glycerol olate and sodium laurate; calcium carbonate, calcium phosphate and sodium dodecylbenzenesulfonate; any of which may be used alone or in combination of two or more. The total amount of the polymerization initiator(s) may be controlled within the range of from 0.02 part by weight to 1 part by weight based on 100 parts by weight of the monomers to be charged.

It is also possible to optionally add a polymerization modifier, a chain transfer agent, a pH adjuster, a gelation improver, an antistatic agent and so forth.

The aqueous medium used to disperse polymeric components of monomers may be charged in an amount as in conventional methods, i.e., of about 1.0 to 1.5 as charge ratio to monomers (water/monomers). The water may be optionally added in the course of polymerization. As to polymerization temperature, it may be set as in conventional methods, i.e., at about 40° C. to 70° C.

With regard to the method by which the aqueous medium, vinyl chloride monomers, other comonomers optionally used, dispersing agent, polymerization initiator and so forth are charged into the polymerization vessel, they may be charged by conventional methods. As for their charges, they may be in conventional quantities.

In the present invention, the polymerization in the aqueous medium may be carried out by a process including suspension polymerization and emulsion polymerization. It is preferred to use suspension polymerization.

Of the vinyl chloride polymers obtained by the above production process of the present invention, vinyl chloride polymers obtained by polymerization especially in the presence of the condensed phosphoric acid type chelating agent and containing from 0.1 ppm to 100 ppm of phosphorus have the advantage that the heat stability is improved.

The method of the present invention is effective when a polymerization vessel having an inner volume of 40 m$^3$ or more, preferably 80 m$^3$, and being provided with a stirrer and a jacket is used. Further, the method is particularly effective when a polymerization vessel having two or more, preferably four or more, cooling baffles therein is used.

In the production process of the present invention, coating films comprised of a polymer scale preventive agent may preferably be formed on the inner walls of the polymerization vessel used and the other portions with which the monomers come into contact in the course of polymerization.

The polymer scale preventive agent used to form such coating films, a method of preparing a coating solution therefor and a method of forming the coating films will be described below.

Polymer Scale Preventive Agent

The polymer scale preventive agent used in its coating solution contains as an effective component an organic compound having at least 10 conjugated π-bonds (hereinafter often "conjugated π-bond compound"), and also the conjugated π-bond compound has a molecular weight of at least 1,000, and preferably at least 1,500. The upper limit of the molecular weight of the organic compound may preferably be 50,000. The molecular weight of this conjugated π-bond compound is measured by gel permeation chromatography (GPC). Preferred examples of such a conjugated π-bond compound are as shown below.

Aldehyde compound/aromatic hydroxyl compound condensation products:

Aldehyde compound/aromatic hydroxyl compound condensation products are condensation products of aldehyde compounds with aromatic hydroxyl compounds. Use of such aldehyde compound/aromatic hydroxyl compound condensation products in polymer scale preventive agents are disclosed in, e.g., Japanese Unexamined Patent Publication No. 57-192413, Japanese Patent Publication No. 6-62709 and Japanese unexamined Patent Publication No. 57-164107.

The aldehyde compounds may include, e.g., formaldehyde, acetaldehyde, propionaldehyde, butylaldehyde, acrolein, crotonaldehyde, benzaldehyde, furfural, phenylacetaldehyde and 3-phenylpropionacetaldehyde. From industrial and economical viewpoints, formaldehyde and acetaldehyde are advantageous.

The aromatic hydroxyl compounds may include, e.g., dihydroxybiphenyl compounds, naphthol compounds, phenol compounds and tannins.

As examples of the dihydroxyphenyl compounds, they may include 2,2'-dihydroxybiphenyl, 2,2'-dihydroxy-5,5'-dimethylbiphenyl, 2,2'-dihydroxy-4,4',5,5'-tetramethylbiphenyl, 2,2'-dihydroxy-5,5'-dichlorobiphenyl, 2,2'-dihydroxy-5,5'-dichlorohexylbiphenyl and 2,2'-dihydroxy-5,5'-di-tert-butylbiphenyl. In particular, from an industrial viewpoint, 2,2'-dihydroxybiphenyl is preferred.

As examples of the naphthol compounds, they may include 1-naphthol, 1,3-dihydroxynaphthalene, 1,5-dihydroxynaphthalene and 1,7-dihydroxynaphthalene.

The phenol compounds may include phenol, cresol, pyrogallol, hydroxyhydroquinone, resorcin, catechol, hydroquinone, bisphenol-A, hydroxybenzoic acid and salicylic acid.

The tannins may include tannic acid, Chinese gallotannin, Turkish gallotannin, sumac tannin, quebracho tannin, and tannin of persimmon (shibuol).

The above condensation products of aldehyde compounds with aromatic hydroxyl compounds can be produced by reacting these reactive components in a suitable medium in the presence of a catalyst, usually at room temperature to 200° C. for 2 to 100 hours, and preferably at 30 to 150° C. for 3 to 30 hours.

The medium in which the above reaction is carried out may include, e.g., water, and organic solvents such as alcohols, ketones and esters, which include, e.g., alcohols such as methanol, ethanol and propanol, ketones such as acetone and methyl ethyl ketone, and esters such as methyl acetate and ethyl acetate.

The medium in which the above reaction is carried out may have a pH within the range of from 1 to 13, and pH adjusters may be used without any particular limitations.

The catalyst used in the above condensation reaction may include, e.g., acidic catalysts such as sulfuric acid, hydrochloric acid, perchloric acid, p-toluenesulfonic acid, methanesulfonic acid and trifluoromethanesulfonic acid, and basic catalysts such as NaOH, KOH and NH$_4$OH.

The proportion of the aldehydes and the aromatic hydroxyl compounds used when the condensation reaction is carried out depends on the types of the aldehyde compound, aromatic hydroxyl compound, solvent and catalyst used, the reaction time, the reaction temperature and so forth. In usual instances, it is preferable to use from 0.1 mol to 10 mols of the aldehyde compound per mol of the aromatic hydroxyl compound.

Pyrogallol/acetone condensation products:

Pyrogallol/acetone condensation products are ondensation products of pyrogallol with acetone, usually having the pyrogallol and the acetone in a molar ratio within the range of from 1/0.1 to 1/10, and usually having a melting point of from 100° C. to 500° C. The melting point is higher with an increase in molecular weights. For example, melting points of from 160° C. to 170° C. correspond to molecular weights of from 1,450 to 1,650; and melting points of from 200° C. to 220° C., to molecular weights of from 2,600 to 4,000. Use of such pyrogallol/acetone condensation products in polymer scale preventive agents is disclosed in, e.g., Japanese Unexamined Patent Publication No. 4-328104.

The pyrogallol/acetone condensation products can be produced by dissolving pyrogallol in acetone, and effecting condensation reaction in the presence of a condensation catalyst. Here, the pyrogallol may be used usually in an amount of from 1 part by weight to 100 parts by weight based on 100 parts by weight of the acetone. As the condensation catalyst, for example, phosphoryl chloride is used. The reaction may be carried out at room temperature to 100° C.

Polyhydric phenol self-condensation product and polyhydric naphthol self-condensation product:

Polyhydric phenols are exemplified by catechol, resorcinol, chlororesorcinol, hydroquinone, chloroglucinol and pyrogallol; dihydroxytoluene and xylene; trihydroxytoluene and xylene; and ethyl-, propyl- or benzyldi- or trihydroxybenzene. Polyhydric naphthols are exemplified by naphthol derivatives such as 1,3-, 1,4-, 1,5- or 1,7-dihydroxynaphthalene. Use of such polyhydric phenol self-condensation products and polyhydric naphthol self-condensation products in polymer scale preventive agents is disclosed in, e.g., Japanese Unexamined Patent Publication No. 54-7487.

The polyhydric phenol self-condensation products or polyhydric naphthol self-condensation products can be produced by heating polyhydric phenol or polyhydric naphthol in an inert atmosphere of nitrogen, argon or the like at a temperature raging from 200° C. to 350° C. and for 4 hours to 100 hours. In this reaction, various catalysts may be used, as exemplified by zinc chloride, aluminum chloride and sodium hydroxide.

Aromatic amine compound condensation products:

Aromatic amine compound condensation products may include, e.g.;

(1) self-condensation products of aromatic amine compounds;
(2) condensation products of aromatic amine compounds with phenol compounds;
(3) condensation products of aromatic amine compounds with aromatic nitro compounds; and
(4) products obtained by making basic the condensation products of aromatic amine compounds with aromatic nitro compounds by the use of alkali metal salts or ammonium compounds.

Use of such aromatic amine compound condensation products is disclosed in, e.g., Japanese Patent Publications No. 59-16561 and No. 60-30681.

The aromatic amine compounds are exemplified by aniline, o-, m- or p-phenylenediamine, o-, m- or p-aminophenol, o-, m- or p-chloroaniline, p-aminobenzene, 2,4-diaminoazobenzene, p-aminoacetanilide, o-, m- or p-methylaniline, 4-aminodiphenylamine, 2-aminodiphenylamine, 4,4-diaminodiphenylamine, N,N-dimethyl-p-phenylenediamine, 4-amino-3'-methoxydiphenylamine, 4-amino-4'-hydroxydiphenylamine, 4-chloro-o-phenylenediamine, 4-methoxy-o-phenylenediamine, 2-amono-4-chlorophenol, 2,3-diaminotoluene, 2,4-diaminophenol, 4-aminodiphenylamine, 2-aminodiphenylamine, 4,41-diaminodiphenylamine, 4-amino-3'-methoxydiphenylamine, and 4-amino-4'-hydroxydiphenylamine.

The phenol compounds are specifically exemplified by phenol and phenol derivatives such as hydroquinone, resorcinol, catechol, hydroxyhydroquinone, pyrogallol, o-, m- or p-chlorophenol, o-, m- or p-hydroxybenzoic acid, 2,4-dihydroxybenzoic acid, 2,5-dihydroxybenzoic acid, 2,6-dihydroxybenzoic acid, 3,4-dihydroxybenzoic acid, 3,5-dihydroxybenzoic acid and 2,5-, 2,6- or 3,5-dihydroxytoluene.

The aromatic nitro compounds are exemplified by nitrobenzene, o-, m- or p-oxynitrobenzene, o-, m- or p-nitroanisole, o-, m- or p-nitrophenetole, o-, m- or p-chloronitrobenzene, o-, m- or p-aminonitrobenzene, o-, m-or p-nitrobenzoic acid, o-, m- or p-nitrobenzenesulfonic acid, o-, m- or p-nitroaniline, 2-nitro-p-phenylenediamine, 2-amino-4-nitrophenol, 2-amino-5-nitrophenol and 4-amino-2-nitrophenol.

To carry out the reaction to obtain the self-condensation products of aromatic amine compounds alone, condensation products of aromatic amine compounds with phenol compounds and condensation products of aromatic amine compounds with aromatic nitro compounds, mineral acid and condensation catalysts are used. The mineral acids are exemplified by hydrochloric acid, nitric acid, hydrobromic acid, phosphoric acid and sulfuric acid.

Preferable condensation catalysts are exemplified by permanganic acid and salts thereof, such as permanganic acid and potassium permanganate; chromic acid-related compounds such as chromium trioxide, potassium dichromate and sodium chlorochromate; metal nitrates such as silver nitrate and lead nitrate; halogens such as iodine and bromine; peroxides such as hydrogen peroxide, sodium peroxide, benzoyl peroxide, potassium persulfate, ammonium persulfate, peracetic acid, cumene hydroperoxide, perbenzoic acid and p-menthane hydroperoxide; oxygen acids or oxygen acid salts, such as iodic acid, potassium iodate and sodium chlorate; metal salts such as ferrous chloride, ferric chloride, copper sulfate, cuprous chloride, cupric chloride and lead acetate; and ozone and oxides such as copper oxide, mercury oxide, cerium oxide, manganese dioxide and osmic acid. It is also effective to use hydrogen peroxide and ferrous chloride in combination.

The self-condensation reaction of aromatic amine compounds alone, condensation reaction of aromatic amine compounds with phenol compounds and condensation reaction of aromatic amine compounds with aromatic nitro compounds may be carried out in the presence of condensation catalysts at 100° C. to 350° C. for 2 hours to 100 hours.

The proportion of the aromatic amine compound, phenol compound or aromatic nitro compound used when the condensation reaction of aromatic amine compounds with phenol compounds and condensation reaction of aromatic amine compounds with aromatic nitro compounds depends on the types of the aromatic amine compound, phenol compound and aromatic nitro compound and catalyst used, the reaction time, the reaction temperature and so forth. In usual instances, it is preferable to use from 0.1 mol to 10 mols of the phenol compound or aromatic nitro compound per mol of the aromatic amine compound.

To make basic the condensation products of aromatic amine compounds with aromatic nitro compounds by the use of alkali metal salts or ammonium compounds, for example, 100 parts by weight of the condensation product of an aromatic amine compound and an aromatic nitro compound is dispersed in water. To the dispersion obtained, 10 to 20 parts by weight of an alkali or ammonium compound such as NaOH, KOH, $Na_2CO_3$, $NH_4OH$ or $CNH_4Cl_2CO_3$ is added, and the mixture obtained is heated at 90 to 140° C. The alkali or ammonium compound may be used in an amount enough to neutralize the mineral acid used at the time of the condensation reaction.

Quinone compound condensation products:

Quinone compound condensation products may include, e.g., condensation products of (A) quinone compounds with (B) at least one selected from aromatic hydroxyl compounds and aromatic amine compounds.

Use of such quinone compound condensation products in polymer scale preventive agents is disclosed in, e.g., Japanese unexamined Patent Publications No. 5-112603 and No. 6-56911.

The (A) quinone compounds may include, e.g., benzoquinones and derivatives thereof such as o-, m- or p-benzoquinone, true p-quinone, o-xylo-p-quinone, thymoquinone, 2-methoxybenzoquinone, gentisyl quinone, polyporic acid and uviquinone-n; naphthoquinones and derivatives thereof such as 6-methyl-1,4-naphthoquinone, 2-methyl-1,4-naphthoquinone, α-naphthoquinone, juglone, lauson, plumbagin, alkannin, echinochrome, vitamin $k_1$, vitamin $k_2$, shiconin, β,β'-dimethyl acrylshiconin, β-hydroxyisovaleroshiconin and teracrylshiconin; anthraquinones and derivatives thereof such as tectoquinone, 3-hydroxy-2-methylanthraquinone, anthraquinone, 2-hydroxyanthraquinone, alizarin, xanthopurupurin, rubiadin, munjistin, crysophanic acid, carminic acid, kermesic acid and laccaic acid-A; and phenanthrenequinones such as phenanthrenequinone.

The aromatic amine compounds used as the reaction component (B) are specifically exemplified by aniline, o-, m- or p-phenylenediamine, o-, m- or p-chloroaniline, o-, m- or p-methylaniline, N,N-dimethyl-p-phenylenediamine, 4-chloro-o-phenylenediamine, 4-methoxy-o-phenylenediamine, 2-amino-4-chlorophenol, 2,3-diaminetoluene, 4-amino-2-aminophenol, specifically o-, m- or p-aminophenol, or o-, m- or p-aminobenzoic acid, 2,3-, 2,4-, 2,5-, 2,6-, 3,4-, 3,5- or 4,6-diaminobenzoic acid, 3- or 4-aminophthalic acid, 2-, 4- or 5-aminoisophthalic acid, 4,6-diaminoisophthalic acid, 2,5- or 2,6-diaminoterephthalic acid, 3-, 4- or 5-aminosalicylic acid, 4-oxyanthranilic acid, o-, m- or p-aminobenzenesulfonic acid, 2,3-, 2,4-, 2,5-, 2,6-, 3,4- or 3,5-diaminobenzenesulfonic acid, 2-amino-1-phenol-4-sulfonic acid and 6-amino-4-chloro-1-phenol-2-sulfonic acid.

Specifically, they are exemplified by α-naphthylamine, β-naphthylamine, 1,5-diaminonaphthalene, 1-amino-5-hydroxynaphthalene, 1,8-diaminonaphthalene and 2,3-diminonaphthalene.

Specifically, they are exemplified by 4-amino-1-naphthol, 1-amino-5-naphthol, 1,2-naphthylenediamine-7-carboxylic acid, 1,5-naphthylenediamine-2-carboxylic acid, 1,5-naphthylenediamine-4-carboxylic acid, 1,6-naphthylenediamine-4-carboxylic acid, 1,8-naphthylenediamine-4-carboxylic acid, 1,2-naphthylenediamine-3-sulfonic acid, 1,2-naphthylenediamine-4-sulfonic acid, 1,2-naphthylenediamine-5-sulfonic acid, 1,2-naphthylenediamine-6-sulfonic acid, 1,2-naphthylenediamine-7-sulfonic acid, 1,3-naphthylenediamine-5-sulfonic acid, 1,3-naphthylenediamine-6-sulfonic acid, 1,4-naphthylenediamine-2-sulfonic acid, 1,4-naphthylenediamine-7-sulfonic acid, 1,5-naphthylenediamine-2-sulfonic acid, 1,5-naphthylenediamine-4-sulfonic acid, 1,5-naphthylenediamine-7-sulfonic acid, 1,6-naphthylenediamine-2-sulfonic acid, 1,6-naphthylenediamine-4-sulfonic acid, 1,8-naphthylenediamine-7-sulfonic acid, 1,8-naphthylenediamine-4-sulfonic acid, 1,8-naphthylenediamine-3,6-disulfonic acid, 1,8-naphthylenediamine-4,5-disulfonic acid, α-amino-β-naphthalenepropionic acid, α-amino-β-naphthalenecarboxylic acid, 2-naphthylamine-1-sulfonic acid, 8-naphthylamine-1-sulfonic acid, 5-naphthylamine-1-sulfonic acid, 1-amino-2-naphthol-4-sulfonic acid, 2-amino-8-naphthol-6-sulfonic acid (γ-acid), 2-amino-5-naphthol-7-sulfonic acid (J-acid) and 1-amino-8-naphthol-3,6-disulfonic acid (H-acid).

Specifically, they are exemplified by diphenylamines such as 4-aminodiphenylamine, 2-aminodiphenylamine, 4,4'-diaminodiphenylamine, 4-amino-3-methoxydiphenylamine, 4-amino-4'-hydroxydiphenylamine, specifically 4-hydroxydiphenylamine, 4-amino-4'-hydroxydiphenylamine, 4-carboxydiphenylamine, 4-amino-4'-carboxydiphenylamine, 4-sulfodiphenylamine and 4-amino-4'-sulfodiphenylamine.

The aromatic hydroxyl compounds used as the reaction component (B) are exemplified by phenol and phenol derivatives such as hydroquinone, resorcinol, catechol, hydroxyhydroquinone, pyrogallol, o-, m- or p-chlorophenol, o-, m- or p-hydroxybenzoic acid, 2,4-dihydroxybenzoic acid, 2,5-dihydroxybenzoic acid, 2,6-dihydroxybenzoic acid, 3,4-dihydroxybenzoic acid, 3,5-dihydroxybenzoic acid and 2,5-, 2,6- or 3,5-dihydroxytoluene.

Specifically, they are exemplified by; α-naphthol, β-naphthol, and naphthol derivatives such as 1,3-, 1,4-, 1,5-, 2,3-, 2,6- or 2,7-dihydroxynaphthalene, 1-hydroxy-2-naphthoic acid and 3-hydroxy-2-naphthoic acid.

The condensation of the component (A) with the component (B) may be carried out in an organic solvent type medium, optionally in the presence of a condensation catalyst. The organic solvent type medium may have a pH within the range of from 1 to 13, and preferably from 4 to 10, and pH adjusters may be used without any particular limitations. As acidic compounds, for example, phosphoric acid, sulfuric acid, phytic acid, acetic acid and the like may be used. As alkali compounds, for example, LiOH, KOH, NaOH, $Na_2CO_3$, $Na_2SiO_3$, $Na_2HPO_4$, $NH_4OH$ and the like or ammonium compounds and organic amine compounds such as ethylenediamine, monoethanolamine and triethanolamine may be used.

As the medium for the condensation reaction, organic solvents as exemplified by alcohols, ketones and esters, or mixed solvents of water and organic solvents miscible with water are preferred. The organic solvents miscible with water may include, e.g., alcohols such as methanol, ethanol and propanol, ketones such as acetone and methyl ethyl ketone, and esters such as methyl acetate and ethyl acetate, any of which may be used.

The condensation catalyst may be optionally used. The condensation catalyst is exemplified by azo catalysts such as α,α'-azobisisobutylonitrile and α,α'-azobis-2,4-dimethylvaleronitrile; elementary or molecular single halogens such as iodine, bromine and chlorine; peroxides such as hydrogen peroxide, sodium peroxide, benzoyl peroxide, potassium persulfate, ammonium persulfate, peracetic acid, cumene hydroperoxide, perbenzoic aicd and p-menthane hydroperoxide; oxygen acids or oxygen acid salts, such as iodic acid, periodic acid, potassium periodate and sodium perchlorate. Incidentally, since the quinone compounds act as condensation catalysts, the condensation reaction takes place even without use of the condensation catalyst.

The condensation products can be obtained by reacting the component (A) with the component (B) in the organic solvent type medium, optionally in the presence of a condensation catalyst, at room temperature to 200° C. for 0.5 to 100 hours.

The proportion of the component (A) or the component (B) in the condensation product depends on the types of the aromatic amine compound, quinone compound and aromatic hydroxyl compound, their compositional ratio, the reaction temperature and the reaction time. In the present invention, it is preferable to use from 0.01 mol to 10.0 mols of the component (B) per mol of the component (A). The polymer scale preventive agent used may have a pH of from 7.5 to 13.5, and particularly preferably from 8.0 to 12.5. As alkali compounds used for pH adjustment, it is possible to use, e.g., alkali metal compounds such as LiOH, NaOH, KOH, $Na_2CO_3$, $Na_2HPO_4$ and $NH_4OH$ or ammonium compounds and organic amine compounds such as ethylenediamine, monoethanolamine, diethanolamine and triethanolamine.

Preparation of Polymer Scale Preventive Agent Coating Solution

As solvents used for preparing the polymer scale preventive agent coating solution, they may include, e.g., water; alcohol type solvents such as methanol, ethanol, propanol, butanol, 2-butanol, 2-methyl-1-propanol, 2-methyl-2-propanol, 3-methyl-1-butanol, 2-methyl-2-butanol and 2-pentanol; ketone type solvents such as acetone, methyl ethyl ketone and methyl isobutyl ketone; ester type solvents such as methyl formate, ethyl formate, methyl acetate, ethyl acetate and ethyl acetoacetate; ether type solvents such as 4-methyldioxolane and ethylene glycol diethyl ether; furans; and non-protonic solvents such as dimethylformamide, dimethyl sulfoxide and acetonitrile. Any of these may be appropriately used alone or in the form of a mixed solvent of two or more solvents.

What is preferred among the above organic solvents is a mixed solvent of water and an organic solvent miscible with water. Among the above organic solvents, organic solvents miscible with water may include alcohol type solvents such as methanol, ethanol and propanol; ketone type solvents such as acetone and methyl ethyl ketone; and ester type solvents such as methyl acetate and ethyl acetate. Particularly, it is preferred that alcohol type solvents are used. In the case when the mixed solvent of water and an organic solvent miscible with water is used, the organic solvent may preferably be contained in such an amount that there is no possibility of ignition or evaporation and there is no problem on the safety in handling, e.g., on toxicity. Stated specifically, the organic solvent may preferably be in an amount not more than 50% by weight, and more preferably not more than 30% by weight. As a coating solution, it is preferred that one having a pH in the range of from 9.0 to 12.5 is used. When the coating solution has a pH ranging as above, the polymer scale preventive effect is more enhanced.

The conjugated π-bond compound in the coating solution used when the polymer scale preventive agent is coated may preferably be in a concentration within the range of from 0.01% by weight to 10% by weight, and more preferably from 0.05% by weight to 3.0% by weight.

In order to more improve the scale preventive effect, the polymer scale preventive agent described above may preferably contain at least one selected from the group consisting of an inorganic colloid and an alkali metal silicate. Such an additive is presumed to have the action to interact with the conjugated π-bond compound to thereby improve the hydrophilic nature of the surfaces of the resulting coating films comprised of the polymer scale preventive agent and improve adhesion of the polymer scale preventive agent to the inner walls of the polymerization vessel.

The inorganic colloid may include, e.g., colloids of oxides or hydroxides of metals selected from aluminum, thorium, titanium, zirconium, antimony, tin, iron and so forth; colloids of tungstic acid, vanadium pentaoxide, gold or silver; silver iodide sol; and colloids of selenium, sulfur, silica or the like. Of these, colloids of oxides or hydroxides of metals selected from aluminum, titanium, zirconium, tin and iron and colloidal silica are preferred. These inorganic colloids may be obtained by any production processes, and there are no particular limitations on the production processes. For example, particle colloids produced by a dispersion process making use of water as a dispersion medium or an agglomeration process are available. Colloidal particles may preferably have a size of 1 to 500 millimicrons.

The alkali metal silicate may include, e.g., alkali metal metasilicates ($M_2SiO_3$), orthosilicates ($M_4SiO_3$), disilicates ($M_2Si_2O_3$), trisilicates ($M_3Si_3O_7$) and sesquisilicates ($M_4Si_3O_{10}$) (where M represents an alkali metal such as lithium, sodium or potassium), and water glass.

The inorganic colloid and the alkali metal silicate may each be used alone or in combination of two or more.

The component selected from the inorganic colloid and the alkali metal silicate may usually be used in an amount of from 0.01 part by weight to 10 parts by weight, and preferably from 0.005 part by weight to 5 parts by weight based on 1 part by weight of the conjugated π-bond compound.

In order to more improve the polymer scale preventive effect, the above polymer scale preventive agent may preferably contain a water-soluble polymeric compound. This compound is also presumed to have the action to interact with the conjugated π-bond compound to improve the the hydrophilic nature of the coating film surfaces.

The water-soluble polymeric compound may include amphoteric polymeric compounds as exemplified by gelatin and casein; anionic polymeric compounds as exemplified by polyacrylic acid, polystyrene-sulfonic acid, carboxymethyl cellulose and alginic acid; cationic nitrogen-containing polymeric compounds as exemplified by polyvinyl pyrrolidone and polyacrylamide; and hydroxyl-group-containing polymeric compounds as exemplified by polyvinyl alcohol, hydroxyethyl cellulose, hydroxypropyl cellulose, and pectin.

Formation of Coating Films:

To form coating films on inner walls of a polymerization vessel by using the coating solution prepared as described above, first the coating solution is coated on the inner walls of the polymerization vessel, and then the coatings are well dried at a temperature within the range of from room temperature to 100° C., optionally followed by washing with water.

The coating solution may preferably be coated not only on the inner walls of the polymerization vessel but also the other portions with which monomers come into contact in the course of polymerization. For example, such portions may include the stirring blades, stirring shaft, baffles, condenser, header, search coils, bolts, nuts and so forth of the polymerization vessel. More preferably the coating films may also be formed on portions to which polymer scales can adhere, other than the portions with which monomers come into contact in the course of polymerization, as exemplified by inner surfaces of machinery and pipes of a system for collecting unreacted monomers. Stated specifically, such portions may include monomer distillation columns, condensers, monomer storage tanks and valves.

Forming the coating films in this way on the portions with which monomers come into contact in the course of polymerization and the other portions to which polymer scales can adhere enables prevention of the polymer scales from adhering to these portions. There are no particular limitations on the method of applying the coating solution on the inner walls of the polymerization vessel. For example, it is possible to use brush coating, spray coating, and a method in which the inside of the polymerization vessel is filled with the coating solution and thereafter the coating solution is withdrawn therefrom, as well as coating methods disclosed, e.g., in Japanese Unexamined Patent Publications No. 57-61001 and No. 55-36288, Japanese Patent Publications No. 56-501116 and No. 56-501117 and Japanese Unexamined Patent Publication No. 59-11303, in which coating solutions are sprayed under $N_2$ gas pressure, sprayed under monomer gas pressure or sprayed by the aid of low-pressure water vapor. Uneven coating may occur by any of these methods, but even if it occurs the method according to the present invention can more effectively prevent adhesion of polymer scales than ever.

During the coating, the polymerization vessel may have a jacket temperature usually within the range of from 10° C. to 95° C., and preferably from 40° C. to 80° C. After the coating, coatings formed may be dried at a jacket temperature of from 30° C. to 95° C., and preferably from 40° C. to 80° C., without opening the inside of the polymerization vessel to keep the inside under reduced pressure.

EXAMPLES

The present invention will be described below in greater detail by giving Examples and Comparative Examples. In the following, "part(s)" refers to "part(s) by weight".

Examples 1 to 4, Comparative Examples 1 to 3

In each Example and Comparative Example, the chelating agent as shown in Table 1, used in the amount also shown in the table, and 350 g of partially saponified polyvinyl alcohol were dissolved in 890 kg of deionized water, and the solution obtained was put into a polymerization vessel made of stainless steel, having an internal volume of 2.1 m$^3$ and equipped with a flat plate baffle, a stirrer and a jacket. The inside of the polymerization vessel was evacuated to a vacuum of 50 mmHg (6.5 kPa), and thereafter 700 kg of vinyl chloride monomers were charged into it. Subsequently, as polymerization initiators, 280 g of t-butyl peroxyneodecanate and 145 g of di-2-ethylhexyl peroxydicarbonate were injected by means of a pump with stirring. Then, at the same time when these were injected, the temperature was raised to initiate polymerization. During the polymerization, the polymerization temperature was kept at 55° C., and the polymerization was stopped at the time when the pressure inside the polymerization vessel reached 6.0 kg/cm$^2$G (690 kPa).

After the polymerization was completed, unreacted monomers were collected in the polymerization vessel, and the polymer obtained was drawn out of the vessel in the form of a slurry. Thereafter, the inside of the polymerization vessel was washed with water to remove residual resin present inside the polymerization vessel. As subsequent procedure, the procedure beginning from the charging of materials and, through the polymerization, ending with the washing with water was set as one batch, and the same procedure was repeated so as to come at the number of batches as shown in Table 2. After the final batch was completed, the polymerization vessel inner wall surfaces having stood in the liquid phase during the polymerization and the flat-plate baffle surfaces facing the inner wall surfaces of the polymerization vessel were observed to examine how the polymer scales adhered thereto. The results of observation were as shown in Table 2.

The polymer slurry drawn out of the inside of the polymerization vessel after the final batch was completed was dehydrated and dried to obtain a vinyl chloride polymer. The vinyl chloride polymer thus obtained was tested on its initial discoloration by the method shown below. The test results were as shown together in Table 2.

Initial discoloration test:

In 100 parts of the vinyl chloride polymer, 1.0 part of tin laurate, 0.5 part of a cadmium type stabilizer and 50 parts of a plasticizer DOP (dioctyl phthalate) were mixed, and the mixture obtained was kneaded at 160° C. for 5 minutes by means of a 6-inch roll. Thereafter the kneaded product was shaped into a sheet of 0.8 mm thick. Next, this sheet was cut into test pieces, which were then superposed in a molding frame of 4 cm×4 cm×1.5 cm, followed by heating and pressure molding at 150° C. and 65 to 70 kg kgf/cm$^2$ to produce test samples. The samples obtained were tested using a photoelectric colorimeter (manufactured by Nihon Denshoku Kogyo K.K.) to measure L*a*b* values according to the Hunter's color difference formula as prescribed in JIS Z-8730 to make evaluation. Evaluation on initial discoloration was simultaneously made by visual observation.

With regard to the vinyl chloride polymers obtained in Examples 1 and 4, the phosphorus contained in each vinyl chloride polymer was determined by the method shown below. Results obtained were as shown in Table 3.

Determination of phosphorus in vinyl chloride polymer:

In a crucible whose weight is known, 2 g of a sample is precisely weighed out, and 30 ml of $H_2SO_4$ and 3 ml of $H_3ClO_4$ are added thereto, followed by heating on a 400° C. sand bath to effect decomposition. This is cooled to room temperature, and $H_2SO_4$ is added so as to provide an internal volume of 10 g. Thereafter, 20 ml of pure water is added. This is put in an ICP emission spectroscopic analyzer (manufactured by Nippon Jareruasshyu; trade name: ICP Model 575) to measure the quantity of phosphorus. Separately therefrom, on two to three samples for blank determination and samples to which a known quantity of phosphorus has been added, prepared using an aqueous potassium dihydrogenphosphate, measurement is made in the same way to prepare a calibration curve. The quantity of phosphorus is determined from the calibration curve and the results of measurement.

With regard to the vinyl chloride polymers obtained in Examples 1 and 4 and Comparative Example 3, their thermal stability was tested by the method shown below. Results obtained were as shown in Table 3.

Thermal stability test:

In 100 parts of each vinyl chloride polymer obtained, 2 parts of a Ba-Zn type composite stabilizer and 45 parts of dioctyl phthalate were mixed, and the mixture obtained was kneaded at 160° C. for 5 minutes by means of a two-roll mill. Thereafter the kneaded product was shaped into a sheet of 0.8 mm thick.

The sheet was cut into test pieces, which were then kept in a 180° C. oven, and the time taken until it blacked was measured.

Comparative Example 4

Using the same polymerization vessel as used in Example 1, an aqueous solution of;

(A) C.I. Direct Blue 1 (trade name; a dye available from Aldrich Chemical Co., Inc.);

(B) C.I. Direct Blue 12 (trade name; a dye available from Aldrich Chemical Co., Inc.); and (C) phytic acid in a weight ratio (A)/(B)/(C) of 5/1/9 and a total concentration {(A)+(B)+(C)} of 5% by weight was spray-coated on the whole inside of the polymerization vessel from nozzles provided at the top of the vapor phase zone in the polymerization vessel. The solution was spray-coated at a rate of 100 g/min for 2 minutes. Next, in the drying step, it took 10 minutes at 50° C. to dry coatings to form coating films. Next, in the washing step, it took 2 minutes to remove the remaining coating solution. Thus, it took 14 minutes to form the coating films comprised of the polymer scale preventive agent (the time taken from the start of the coating of the polymer scale preventive agent coating solution until the completion of the washing step).

After the coating films of the polymer scale preventive agent were coated on the portions with which vinyl chloride monomers came into contact in the course of polymerization, including the inner walls of the polymerization vessel, the polymerization to obtain vinyl chloride polymer was carried out under the same conditions as in Comparative Example 3. After the polymerization was completed, unreacted monomers were collected in the polymerization vessel, and the polymer obtained was drawn out of the vessel in the form of a slurry. Thereafter, the inside of the polymerization vessel was washed with water to remove residual resin present inside the polymerization vessel. As subsequent procedure, the procedure of from the formation of coating films of the polymer scale preventive agent, the charging of materials, the polymerization and up to the washing with water was set as one batch, and the same procedure was repeated so as to come at the number of batches as shown in Table 2. After the final batch was completed, the polymerization vessel inner wall surfaces having stood in the liquid phase during the polymerization and the flat-plate baffle surfaces facing the inner wall surfaces of the polymerization vessel were observed to examine how the polymer scales adhered thereto. The results of observation were as shown in Table 2. The initial discoloration was also tested to obtain the results also shown in Table 2.

Comparative Example 5

The coating was carried out in the same manner as in Comparative Example 4, except that the solution was spray-coated at a rate of 100 g/min for 5 minutes. As the result, in the drying step, it took 10 minutes at 50° C. to dry coatings to form coating films. In the washing step, it took 2 minutes to remove the remaining coating solution. Then the polymerization was carried out in the same manner as in Comparative Example 4. Also, the same procedure was repeated so as to come at the number of batches as shown in Table 2. After the final batch was completed, the polymerization vessel inner wall surfaces at the liquid phase in the polymerization vessel and the flat-plate baffle surfaces facing the inner wall surfaces of the polymerization vessel were observed to examine how the polymer scales adhered thereto. The results of observation were as shown in Table 2. The initial discoloration was also tested to obtain the results also shown in Table 2.

TABLE 1

| | Time taken to form coating films of polymer scale preventive agent (min.) | Chelating agent Type | Amount (ppm) |
|---|---|---|---|
| Example 1 | No coating step | Tetrapolyphosphoric acid (cation moiety content.: 0 mol %) (molecular weight: 338) | 50 |
| Example 2 | No coating step | Nitrilotriacetic acid | 100 |
| Example 3 | No coating step | Citric acid | 100 |
| Example 4 | No coating step | Sodium tetrapolyphosphate (cation moiety content: 150 mol %) molecular weight: 470 | 100 |
| Comparative Example 1 | No coating step | Orthophsphoric acid (cation moiety content: 0 mol %) (molecular weight: 98 | 100 |
| Comparative Example 2 | No coating step | Acetic acid | 100 |
| Comparative Example 3 | No coating step | Not added | 0 |
| Comparative Example 4 | 14 minutes | Not added | 0 |
| Comparative Example 5 | 17 minutes | Not added | 0 |

*Weight ratio with respect to vinyl chloride monomers charged.

TABLE 2

| | | Adhesion of polymer scales | | | |
|---|---|---|---|---|---|
| | Number of batches | Polymerization vessel inner walls | Baffle surfaces facing polymerization vessel inner walls | Initial discoloration test | |
| Example 1 | 5 | No scales Adhered | No scales adhered | L: 72.0 a: −1.6 b: 10.6 | Good |
| Example 2 | 3 | No scales Adhered | Scales a little adhered | L: 71.0 a: −1.5 b: 10.8 | Good |
| Example 3 | 3 | No scales adhered | Scales a little adhered | L: 71.4 a: −1.5 b: 10.7 | Good |
| Example 4 | 3 | No scales adhered | Scales a little adhered | L: 71.8 a: −1.4 b: 10.8 | Good |
| Comparative Example 1 | 2 | Scales a little adhered | Scales adhered to the whole surfaces | L: 72.1 a: −1.6 b: 10.6 | Good |
| Comparative Example 2 | 1 | Scales a little adhered | Scales adhered to the whole surfaces | L: 71.8 a: −1.5 b: 10.7 | Good |
| Comparative Example 3 | 1 | Scales adhered to the whole surfaces | Scales adhered to the whole surfaces | L: 71.8 a: −1.5 b: 10.6 | Good |

TABLE 2-continued

| | Number of batches | Adhesion of polymer scales | | Initial discoloration test |
|---|---|---|---|---|
| | | Polymerization vessel inner walls | Baffle surfaces facing polymerization vessel inner walls | |
| Comparative Example 4 | 3 | Scales a little adhered | Scales adhered to the whole surfaces | L: 71.9 a: −1.5 b: 10.7 Good |
| Comparative Example 5 | 5 | No scales adhered | No scales adhered | L: 71.6 a: −1.9 b: 13.2 Greatly yellowish, seriously causing initial discoloration |

TABLE 3

| | Phosphorus content in vinyl chloride polymer ppm | Thermal stability test min. |
|---|---|---|
| Example 1 | 3.6 | 100 |
| Example 4 | 1.9 | 95 |
| Comparative Example 3 | 0 | 90 |

In the following Examples, polymer scale preventive agents having various condensation products as effective components are used. Production examples of these condensation products are shown below.

Production of Condensation Products

In the following Production Examples, the molecular weight of each condensation product obtained was measured in the following way.

Measurement of molecular weight:

Weight average molecular weight in terms of polystyrene was measured by gel permeation chromatography (GPC) under the following conditions.

Columns:
  Guard column:
    Trade name: SLIM-PACK GPC-800DP, available from Shimadzu Corporation.
  Analytical columns:
    Trade name: SLIM-PACK GPC-803D, 802D, available from Shimadzu Corporation.
Mobile phase: 10 mM LiBr/DMF
Flow rate: 1.0 ml/min.
Detector: RI
Temperature: 60° C.

Production Example 1

Production of condensation product No. 1:

Into a pressure-resistant reaction vessel, 30,000 mols (960 kg) of methanol, 100 mols (15.8 kg) of 1,8-diaminonaphthalene, 50 mols (5.4 kg) of parabenzoquinone, 250 mols (31.5 kg) of pyrogallol were charged, and the temperature was raised to 80° C. with stirring. After the reaction was carried out at 80° C. for 5 hours, the reaction mixture was cooled to obtain a methanol solution of a condensation product. Thus, a solution of condensation product No. 1 was obtained. The condensation product No. 1 had a weight average molecular weight of 2,000.

Production Example 2

Production of condensation product No. 2:

With reference to Production Example 3 disclosed in Japanese Patent Publication No. 6-62709, a scale preventive agent was produced.

Into a pressure-resistant reaction vessel, 30 mols (5.59 kg) of 2,2'-dihydroxybiphenyl, 22.5 mols (0.711 kg) of paraformaldehyde with a purity of 95%, 0.19 kg of para-toluenesulfonic acid and 10 liters of ethylene glycol dimethyl ether were charged, and the temperature was raised to 130° C. with stirring. After the reaction was carried out at 130° C. for 17 hours, the reaction mixture was cooled to 50° C. and then put into 50 liters of water. The resin deposited as a result of putting it into water was filtered and then washed with water, followed by drying to obtain 5.1 kg of a 2,2'-dihydroxybiphenyl-formalin condensation resin (condensation product No. 2). The condensation product No. 2 had a weight average molecular weight of 4,300.

Production Example 3

Production of condensation product No. 3:

With reference to Production Example 1 disclosed in Japanese Unexamined Patent Publication No. 57-164107, a scale preventive agent was produced.

Into a pressure-resistant reaction vessel, 250 mols (36.0 kg) of 1-naphthol and 180 liters of an aqueous 1N NaOH solution (containing 180 mols, 7.2 kg, of NaOH) were charged, and the temperature was raised to 70° C. with stirring. Next, to the reaction mixture, formaldehyde (aqueous 38 w/v % solution, 19.75 liters, 250 mols) was dropwise added over a period of 1.5 hours. During the addition, the internal temperature of the reaction vessel was controlled so as not to become higher than 80° C. Then, the reaction mixture was cooled to 60° C. over a period of 3 hours while continuing the stirring. Next, the temperature of the reaction mixture was raised to 98° C. to carry out the reaction at 98° C. for 0.5 hour. Thereafter, the reaction mixture was cooled to obtain an alkaline solution of a condensation product (condensation product No. 3). The condensation product No. 3 had a weight average molecular weight of 1,500.

Production Example 4

Production of condensation product No. 4:

With reference to Coating Compound Synthesis 2 disclosed in Japanese Unexamined Patent Publication No. 57-192413, a scale preventive agent was produced.

Into a pressure-resistant reaction vessel, 100 mols (12.6 kg) of pyrogallol and 100 liters of water were charged, and the pyrogallol was dissolved in the water. Next, to the solution obtained, 200 mols (21.2 kg) of benzaldehyde and 300 mols (29.4 kg) of phosphoric acid were added, and the mixture of these was reacted at 100° C. for 6 hours. As a result, a water-insoluble reddish-brown product was obtained. This water-insoluble product was washed with ether, followed by extraction with methanol to extract a methanol-soluble matter from the water-insoluble product, and then the methanol was removed from the extract by drying to obtain condensation product No. 4 (pyrogallol-benzaldehyde condensate), having a weight average molecular weight of 4,000.

Production Example 5

Production of condensation product No. 5:

With reference to Production Example 1 disclosed in Japanese Patent Publication No. 59-16561, a scale preventive agent was produced.

Into a pressure-resistant reaction vessel, 100 mols (10.8 kg) of m-phenylenediamine, 200 mols (22.0 kg) of resorcinol and as a catalyst 1.04 kg of 35% hydrochloric acid (10 mols as HCl) were charged, and the temperature was raised to 305° C. Immediately after the mixture in the reaction vessel reached 305° C., it was cooled. The water vapor formed in the course of the temperature elevation and reaction was removed, and the internal pressure was kept at 150 kPa or below. After cooling, a m-phenylenediamine-resorcinol condensate was obtained, which was then pulverized to obtain condensation product No. 5, having a weight average molecular weight of 3,000.

Production Example 6

Production of condensation product No. 6:

With reference to Production Example VI disclosed in Japanese Patent Publication No. 59-16561/1984, a scale preventive agent was produced.

Into a pressure-resistant reaction vessel, 100 mols (10.9 kg) of p-aminophenol and 0.99 kg of 30% hydrochloric acid (9.5 mols as HCl) were charged, and the temperature was raised to 169° C. Immediately after the reaction mixture reached 169° C., 18 liters of xylene was slowly added. The xylene was added so that the water formed in the course of the condensation reaction was removed as an azeotropic mixture. Next, the temperature of the reaction mixture was raised to 222° C., and the reaction was carried out at 222° C. for 3 hours. The xylene-water mixed vapor formed in the course of the reaction was removed, and the internal pressure was kept at 150 kPa or below. After the reaction was carried out for 3 hours, the reaction mixture was cooled. The reaction product obtained was solid. Next, the reaction product was pulverized into fine particles, and thereafter washed with water, followed by filtration and then drying to obtain condensation product No. 6, having a weight average molecular weight of 2,500.

Production Example 7

Production of condensation product No. 7:

With reference to Production Example 1 disclosed in Japanese Unexamined Patent Publication No. 54-7487, a scale preventive agent was produced.

Into a reaction vessel, 200 mols (22.0 kg) of resorcinol was charged, which was then heated in an atmosphere nitrogen. The temperature of resorcinol was raised to 300° C., and the reaction was carried out at 300° C. for 8 hours, followed by cooling. The solid-state self-condensation resorcinol thus obtained was pulverized to obtain condensation product No. 7, having a weight average molecular weight of 1,700.

Preparation of coating solutions:

Using the condensation products Nos. 1 to 7 obtained in the above and the solvents and pH adjusters shown in Table 4, coating solutions (1) to (7) were prepared under conditions as also shown in Table 4.

TABLE 4

|  | Condensation product No. | Solvent (weight ratio) | Concentration of coating solution (wt. %) | pH adjuster (pH value of coating solution) |
|---|---|---|---|---|
| Coating solution (1) | No. 1 | Water/MeOH 90/10 | 0.5 | NaOH (pH = 10) |
| Coating solution (2) | No. 2 | Water/MeOH 70/30 | 0.5 | KOH (pH = 11) |
| Coating solution (3) | No. 3 | Water/MeOH 90/10 | 0.5 | NaOH (pH = 10) |
| Coating solution (4) | No. 4 | Water/MeOH 90/10 | 0.5 | KOH (pH = 10) |

TABLE 4-continued

|  | Condensation product No. | Solvent (weight ratio) | Concentration of coating solution (wt. %) | pH adjuster (pH value of coating solution) |
|---|---|---|---|---|
| Coating solution (5) | No. 5 | Water/MeOH 70/30 | 0.5 | NaOH (pH = 11) |
| Coating solution (6) | No. 6 | Water/MeOH 90/10 | 0.5 | KOH (pH = 11) |
| Coating solution (7) | No. 7 | Water/MeOH 70/30 | 0.5 | KOH (pH = 10) |

Example 5

Figure 2:
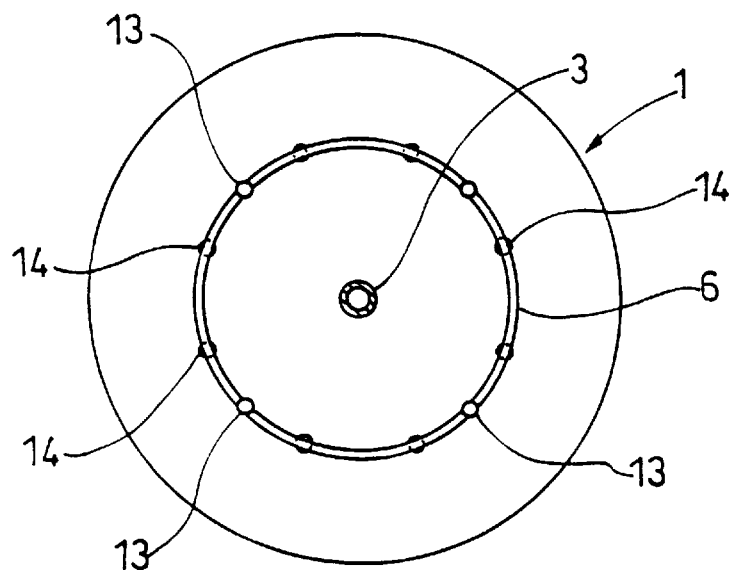
FIG. 2 is a schematic plan view of the polymerization apparatus at its cross section along the line A—A in FIG. 1.
Figure 3:
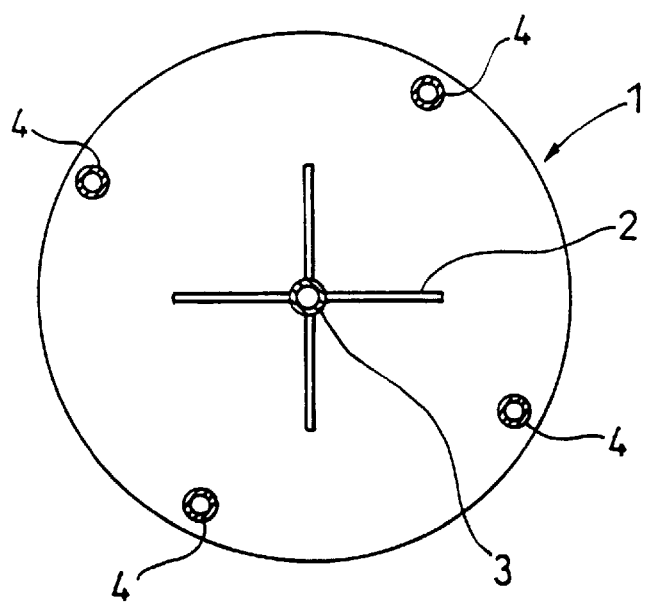
FIG. 3 is a schematic plan view of the polymerization apparatus at its cross section along the line B—B in FIG. 1.

The polymerization apparatus shown in FIGS. 1 to 3 was used. FIG. 1 is a schematic illustration of a vertical cross section of the polymerization apparatus. FIG. 2 is a horizontal cross section along the line A—A in FIG. 1, which corresponds to the position of a coating assembly 6. FIG. 3 is a horizontal cross section along the line B—B in FIG. 1.

In this apparatus, a polymerization vessel 1 is comprised of a substantially cylindrical side wall 1a, a substantially hemispherical ceiling 1b and the bottom 1c, and has an inner volume of 2 m$^3$ and a horizontal cross-sectional area of 0.865 m$^2$ in the space inside the cylindrical portion. Paddle blades 2 provided on a stirrer shaft 3 disposed at the center of the polymerization vessel 1 each have a blade diameter of 517 mm. The apparatus also has a reflux condenser (not shown) as a cooling means at the top of the polymerization vessel and a jacket (not shown) on the external sidewall.

At the top inside the polymerization vessel, a coating assembly 6 is attached which is provided with upward spray-coating nozzles 13 and downward spray-coating nozzles 14, which are twelve nozzles in total. A pipe 7 is connected to the coating assembly 6, and the pipe 7 is branched to a coating solution pipe line 18 and a wash water pipe line 19.

As cooling baffles 4, four cooling baffles (through which cooling water is flowed as shown by streamlines 5) each comprised of an austenite stainless steel cylindrical pipe of 60.5 mm in outer diameter and 52.5 mm in inner diameter are provided point-to-point symmetrically at equal intervals and at positions that do not obstruct the rotation of the paddle blades (positions 455 mm distant from the center of the polymerization vessel). These four cooling baffles have a total horizontal cross-sectional area of 0.01149 m$^2$.

A pipe 20 is connected to the bottom of the polymerization vessel 1, and is branched to a polymer slurry collecting pipe line 10 and a waste-liquor collecting pipe line 12.

Steps of forming coating films of polymer scale preventive agent:

1) Hot water kept at 50° C. was passed through the jacket attached to the polymerization vessel.

2) Valves 16 and 9 were closed. Valves 17, 15, 8 and 11 were opened. The polymer scale preventive agent coating solution was fed to the polymer scale preventive agent coating assembly 6 through the pipe line 18 for feeding the polymer scale preventive agent coating solution (1), and was spray-coated through the spray nozzles 13 and 14 attached to the assembly. The solution was spray-coated at a flow rate of 1,200 g/min for 2 minutes. During the spray coating, the polymer scale preventive agent coating solution remaining at the bottom inside the polymerization vessel was collected through the waste-liquor collecting pipe line 12.

3) After the spray coating was completed, the valves 15 and 17 were closed. It took 10 minutes at 50° C. to dry coatings to form the coating films. Thereafter, the hot water flowing to the attached jacket was stopped.

4) Next, in the washing step, the valves 16 and 15 were opened. Wash water was fed to the coating assembly 6 through the wash water pipe line 19, and was sprayed out of the attached spray coating nozzles 13 and 14 to remove the polymer scale preventive agent coating solution remaining in the polymerization vessel. During the washing with water, the wash liquid remaining at the bottom of the polymerization vessel was collected through the waste-liquor collecting pipe line 12. It took 2 minutes in the washing step to remove the remaining polymer scale preventive agent coating solution. Thus, the time taken to form the coating films comprised of the polymer scale preventive agent was 14 minutes. Next, after the washing step was completed, the valves 16, 15, 8 and 11 were closed.

Polymerization step:

Into this polymerization vessel, the chelating agent as shown in Table 5, used in the amount also shown in the table, 900 g of deionized water, 330 g of partially saponified polyvinyl alcohol and 429 g of di-2-ethylhexyl peroxydicarbonate were charged. The inside of the polymerization vessel was evacuated to a vacuum of 50 mmHg, and thereafter 660 kg of vinyl chloride monomers were charged into it. Then, the paddle blades 2 were rotated, hot water was passed through the jacket with stirring, and the internal temperature was raised to 57° C. to initiate polymerization. At the time the internal temperature reached 57° C., cooling water was flowed through the cooling baffles and jacket, and the polymerization reaction was continued while keeping the internal temperature at 57° C. At the time the polymerization conversion reached 5%, the reflux condenser was started operating to further continue the polymerization reaction.

After the pressure inside the polymerization vessel dropped to 6.5 kg/cm$^2$ G(740 kPa), the reaction was stopped (the polymerization time was 4.5 hours).

After the polymerization was completed, unreacted monomers were collected in the polymerization vessel, and after the valves 8 and 9 were opened the polymer obtained was drawn out of the vessel in the form of a slurry through the polymer slurry collecting pipe line 10. Thereafter, the inside of the polymerization vessel was washed with water to remove residual resin present inside the polymerization vessel. As subsequent procedure, the procedure of from the formation of coating films of the polymer scale preventive agent up to the polymerization step (beginning from the charging of materials and, through the polymerization, ending with the washing with water) was set as one batch, and the same procedure was repeated so as to come at the number of batches as shown in Table 6. After the final batch was completed, the polymerization vessel inner wall surfaces and the cooling baffle surfaces facing the inner wall surfaces (which are shaded when the polymer scale preventive agent is spray-coated, to tend to have insufficient coatings) of the polymerization vessel were observed to examine how the polymer scales adhered thereto. The results of observation were as shown in Table 6.

The polymer slurry drawn out of the inside of the polymerization vessel after the final batch was completed was dehydrated and dried to obtain a vinyl chloride polymer. The vinyl chloride polymer thus obtained was tested on its initial discoloration by the method described in Examples 1 to 4 and also on fish eyes and foreign matter examination by the method shown below. The test results were as shown together in Table 6.

Measurement of fish eyes:

Using a 140° C. 6-inch roll, 100 parts of the vinyl chloride polymer obtained, 50 parts of DOP, 0.1 part of barium stearate, 0.1 part of cadmium stearate, 0.8 part of cetyl alcohol, 2.0 parts of a tin type stabilizer, 0.5 part of titanium dioxide and 0.1 part of carbon black were mixed and kneaded, and the kneaded product was taken off in the form of a sheet of 0.3 mm thick. White transparent particles present in 100 cm$^2$ of this sheet were counted.

Foreign matter examination:

On white paper, 50 g of the vinyl chloride polymer obtained was placed and 5 ml of a destaticizing solution was added thereto, which are then thoroughly mixed. Thereafter, particles of any foreign matter other than vinyl chloride polymer powder are picked up under visual inspection. The number of foreign matter particles is indicated as: (number of foreign matter particles picked up)×2=(number of foreign matter particles in 100 g of vinyl chloride polymer).

Examples 6 to 8, Comparative Examples 6 to 8

Vinyl chloride polymers were produced in the same manner as in Example 5 except that the chelating agents as shown in Table 5 were each added in the amount as shown in the table, or did not added at all.

Comparative Example 9

A vinyl chloride polymer was produced in the same manner as in Example 5 except that the polymer scale preventive agent coating solution was coated at a rate of 1,200 g/min for 5 minutes and the chelating agent was not added.

Comparative Example 10

A vinyl chloride polymer was produced in the same manner as in Example 4 except that the chelating agent as shown in Table 5 was added in the amount as shown in the table and the polymer scale preventive agent coating solution was not applied.

Examples 9 to 14

Vinyl chloride polymers were produced in the same manner as in Example 5 except that the coating solutions were replaced with those shown in Table 7.

Results obtained are shown in Table 8.

TABLE 5

| | Polymer scale preventive agent coating solution | Time taken to form coating films of Polymer scale preventive agent (min.) | Chelating agent Type | Amount (ppm) |
|---|---|---|---|---|
| Example 5 | Coating solution (1) | 14 minutes Coating weight 2400 g | Tetrapolyphosphoric acid (cation moiety content: 0 mol %) (molecular weight: 338) | 50 |

TABLE 5-continued

| | Polymer scale preventive agent coating solution | Time taken to form coating films of Polymer scale preventive agent (min.) | Chelating agent Type | Amount (ppm) |
|---|---|---|---|---|
| Example 6 | Coating solution (1) | 14 minutes Coating weight 2400 g | Nitrilotriacetic acid | 100 |
| Example 7 | Coating solution (1) | 14 minutes Coating weight 2400 g | Citric acid | 100 |
| Example 8 | Coating solution (1) | 14 minutes Coating weight 2400 g | Sodium tetrapolyphosphate (cation moiety content: 150 mol %) (molecular weight: 470) | 100 |
| Comparative Example 6 | Coating solution (1) | 14 minutes Coating weight 2400 g | Orthophosphoric acid | 100 |
| Comparative Example 7 | Coating solution (1) | 14 minutes Coating weight 2400 g | Acetic acid | 100 |
| Comparative Example 8 | Coating solution (1) | 14 minutes Coating weight 2400 g | Not added | 0 |
| Comparative Example 9 | Coating solution (1) | 17 minutes Coating weight 6000 g | Not added | 0 |
| Comparative Example 10 | Nil | — | Tetrapolyphosphoric acid (cation moiety content: 0 mol %) (molecular weight: 338) | 50 |

*Weight ratio with respect to vinyl chloride monomers charged.

TABLE 6

| | Number of batches | Polymerization vessel inner walls | Adhesion of polymer scales — Cooling baffle surfaces facing polymerization vessel inner walls | Initial discoloration test | Fish eye test | Foreign matter picked up |
|---|---|---|---|---|---|---|
| Example 5 | 20 | No scales adhered | No scales adhered | L: 71.8 a: −1.6 b: 10.7 | Good | 3 | 4 |
| Example 6 | 15 | No scales adhered | Scales a little adhered | L: 71.5 a: −1.5 b: 10.9 | Good | 7 | 6 |
| Example 7 | 15 | No scales adhered | Scales a little adhered | L: 71.5 a: −1.6 b: 10.8 | Good | 5 | 6 |
| Example 8 | 15 | No scales adhered | Scales a little adhered | L: 71.7 a: −1.6 b: 10.9 | Good | 7 | 6 |
| Comparative Example 6 | 10 | No scales adhered | Scales adhered to bottom planes | L: 72.0 a: −1.6 b: 10.7 | Good | 55 | 6 |
| Comparative Example 7 | 5 | No scales adhered | Scales adhered to bottom planes | L: 71.8 a: −1.5 b: 10.8 | Good | 48 | 8 |
| Comparative Example 8 | 5 | No scales adhered | Scales adhered to bottom planes | L: 72.0 a: −1.6 b: 10.7 | Good | 50 | 8 |
| Comparative Example 9 | 20 | No scales adhered | Scales a little adhered | L: 70.7 a: −1.8 b: 13.0 | Greatly yellowish, seriously causing initial discoloration | 10 | 36 |
| Comparative Example 10 | 10 | Scales a little adhered to the vapor phase zone | No scales adhered | L: 72.0 a: −1.6 b: 10.6 | Good | 25 | 6 |

TABLE 7

| | Polymer scale preventive agent Coating solution | Time taken to form coating films of polymer scale preventive agent (min.) | Chelating agent Type | Amount* (ppm) |
|---|---|---|---|---|
| Example 9 | Coating solution (2) | 14 minutes Coating weight 2400 g | Tetrapolyphosphoric acid | 50 |
| Example 10 | Coating solution (3) | 14 minutes Coating weight 2400 g | Tetrapolyphosphoric acid | 50 |
| Example 11 | Coating solution (4) | 14 minutes Coating weight 2400 g | Tetrapolyphosphoric acid | 50 |
| Example 12 | Coating solution (5) | 14 minutes Coating weight 2400 g | Tetrapolyphosphoric acid | 50 |
| Example 13 | Coating solution (6) | 14 minutes Coating weight 2400 g | Tetrapolyphosphoric acid | 50 |
| Example 14 | Coating solution (7) | 14 minutes Coating weight 2400 g | Tetrapolyphosphoric acid | 50 |

TABLE 8

| | Number of batches | Adhesion of polymer scales | | Initial discoloration test | Fish eye test | Foreign matter picked up |
|---|---|---|---|---|---|---|
| | | Polymerization vessel inner walls | Cooling baffle surfaces facing polymerization vessel inner walls | | | |
| Example 9 | 20 | No scales adhered | No scales adhered | L: 71.8<br>a: −1.5<br>b: 10.7 | Good | 4 | 10 |
| Example 10 | 20 | No scales adhered | No scales adhered | L: 72.1<br>a: −1.4<br>b: 10.7 | Good | 3 | 8 |
| Example 11 | 20 | No scales adhered | No scales adhered | L: 72.8<br>a: −1.6<br>b: 10.9 | Good | 4 | 6 |
| Example 12 | 20 | No scales adhered | No scales adhered | L: 72.5<br>a: −1.5<br>b: 10.8 | Good | 2 | 6 |
| Example 13 | 20 | No scales adhered | No scales adhered | L: 72.4<br>a: −1.4<br>b: 10.7 | Good | 4 | 8 |
| Example 14 | 20 | No scales adhered | No scales adhered | L: 72.5<br>a: −1.5<br>b: 10.8 | Good | 4 | 6 |

Example 15

A polymerization apparatus having the same construction as that shown in FIGS. 1 to 3 but having a larger size was used.

In this apparatus, the polymerization vessel 1 has an inner volume of 80 m³ and a horizontal cross-sectional area of 10.2 m² in the space inside the cylindrical upright barrel portion. Paddle blades 2 provided on the stirrer shaft 3 disposed at the center of the polymerization vessel 1 each have a blade diameter of 1,775 mm. The apparatus also has a reflux condenser (not shown) as a cooling means at the top of the polymerization vessel and a jacket (not shown) on the external sidewall. At the top inside the polymerization vessel, a coating assembly 6 is equiped which is provided with spray-coating nozzles 13 and 14, which are twelve nozzles in total.

As cooling baffles 4, four baffles each comprised of an austenite stainless steel cylindrical pipe of 190 mm in outer diameter and 178 mm in inner diameter are provided point-to-point symmetrically with respect to the shaft 3, at equal intervals and at positions that do not obstruct the rotation of the paddle blades (positions 1,565 mm distant from the center of the polymerization vessel).

Steps of forming coating films comprised of polymer scale preventive agent:

1) Hot water kept at 50° C. was passed through the jacket attached to the polymerization vessel.
2) Valves 16 and 9 were closed. Valves 17, 15, 8 and 11 were opened. The polymer scale preventive agent coating solution was fed to the polymer scale preventive agent coating assembly 6 through the pipe line 18 for feeding the polymer scale preventive agent coating solution, and was spray-coated through the spray nozzles 13 and 14 attached to the assembly. The solution was spray-coated at a flow rate of 150 l/min for 1 minutes. During the spray coating, the polymer scale preventive agent coating solution remaining at the bottom inside the polymerization vessel was collected through the waste-liquor collecting pipe line 12.
3) After the spray coating was completed, the valves 15 and 17 were closed. It took 15 minutes at 50° C. to dry coatings to form the coating films. Thereafter, the hot water flowing to the attached jacket was stopped.
4) Next, in the washing step, the valves 16 and 15 were opened. Wash water was fed to the polymer scale preventive agent coating assembly 6 through the wash water pipe line 19, and was sprayed out of the attached spray coating nozzles 13 and 14 to remove the polymer scale preventive agent coating solution remaining in the polymerization vessel. During the washing with water, the wash liquid remaining at the bottom of the polymerization vessel was collected through the waste-liquor collecting pipe line 12. It took 8 minutes in the washing step to remove the remaining polymer scale preventive agent coating solution. After the washing step was completed, the valves 16, 15, 8 and 11 were closed.

Polymerization step:

Into this polymerization vessel, the chelating agent as shown in Table 9, used in the amount also shown in the table, 38.2 t of deionized water, 14 kg of partially saponified polyvinyl alcohol and 18.2 kg of di-2-ethylhexyl peroxydicarbonate were charged. The inside of the polymerization vessel was evacuated to a vacuum of 50 mmHg, and thereafter 28 t of vinyl chloride monomers were charged into it. Then, hot water was passed through the jacket with stirring, and the internal temperature was raised to 57° C. to initiate polymerization. At the time the internal temperature reached 57° C., cooling water was flowed through the cooling baffles and jacket, and the polymerization reaction was continued while keeping the internal temperature at 57° C. At the time the polymerization conversion reached 5%, the reflux condenser was started operating to further continue the polymerization reaction.

After the pressure inside the polymerization vessel dropped to 6.5 kg/cm² (gauge pressure), the reaction was stopped (the polymerization time was 4.1 hours).

After the polymerization was completed, unreacted monomers were collected in the polymerization vessel through a collecting line (not shown), and after the valves 8 and 9 were opened the polymer obtained was drawn out of the vessel in the form of a slurry through the polymer slurry collecting pipe line 10. Thereafter, the inside of the polymerization vessel was washed with water to remove residual resin present inside the polymerization vessel. As subsequent procedure, the procedure of from the formation of coating films of the polymer scale preventive agent up to the polymerization step (beginning from the charging of materials and, through the polymerization, ending with the washing with water) was set as one batch, and the same procedure was repeated so as to come at the number of batches as shown in Table 10. After the final batch was completed, the polymerization vessel inner wall surfaces and the cooling baffle surfaces facing the inner wall surfaces of the polymerization vessel were observed to examine how the polymer scales adhered thereto. The results of observation were as shown in Table 10.

The polymer slurry drawn out of the inside of the polymerization vessel after the final batch was completed was dehydrated and dried to obtain a vinyl chloride polymer. The vinyl chloride polymer thus obtained was tested on its initial discoloration, fish eyes and foreign matter by the methods previously described. The test results were as shown together in Table 10.

Comparative Example 11

A vinyl chloride polymer was produced in the same manner as in Example 15 except that the chelating agent was not added to the polymerization system.

Comparative Example 12

A vinyl chloride polymer was produced in the same manner as in Example 15 except that the polymer scale preventive agent coating solution was coated in the manner shown below and the chelating agent was not added to the polymerization system.

The coating solution was spray-coated at a flow rate of 150 1/min for 2 minutes, and the coatings formed were dried at 50° C. for 17 minutes. In the step of washing with water, it took 10 minutes.

TABLE 9

| | Polymer scale preventive agent coating solution | Time taken to form coating films of Polymer scale preventive agent (min.) | Chelating agent Type | Amount* (ppm) |
|---|---|---|---|---|
| Example 15 | Coating solution (1) | 25 minutes Coating weight 150 kg | Tetrapoly-phosphoric acid | 100 |
| Comparative Example 11 | Coating solution (1) | 25 minutes Coating weight 150 kg | Nil | — |
| Comparative Example 12 | Coating solution (1) | 30 minutes Coating weight 300 kg | Nil | — |

TABLE 10

| | Number of batches | Adhesion of polymer scales Polymerization vessel inner walls | Adhesion of polymer scales Cooling baffle surfaces facing polymerization vessel inner walls | Initial discoloration test | Fish eye test | Foreign matter picked up |
|---|---|---|---|---|---|---|
| Example 15 | 20 | No scales adhered | No scales adhered | L: 72.0 a: −1.7 b: 11.5 | Good | 3 | 6 |
| Comparative Example 11 | 20 | No scales adhered | Scales adhered to bottom planes | L: 71.9 a: −1.6 b: 11.4 | Good | 21 | 8 |
| Comparative Example | 20 | No scales | Scales a little | L: 70.9 | Greatly yellowish, | 6 | 24 |

TABLE 10-continued

| | Number of batches | Adhesion of polymer scales Polymerization vessel inner walls | Adhesion of polymer scales Cooling baffle surfaces facing polymerization vessel inner walls | Initial discoloration test | Fish eye test | Foreign matter picked up |
|---|---|---|---|---|---|---|
| Example 12 | | adhered | adhered | a: −1.5 b: 13.2 | seriously causing initial discoloration | | |

What is claimed is:

1. A process for producing vinyl chloride polymers by polymerization of vinyl chloride monomers or a vinyl monomer mixture chiefly comprised of a vinyl chloride monomer in a polymerization vessel, comprising carrying out said polymerization in an aqueous medium by the aid of a polymerization initiator, wherein:
   said polymerization is carried out in the presence of a chelating agent capable of forming a complex of iron (II) or iron (III) in an aqueous polymerization system containing said monomers or monomer mixture; and
   wherein coating films comprised of a polymer scale preventive agent is formed on the inner walls of said polymerization vessel and the other portions with which the monomers come into contact in the course of polymerization.

2. The process according to claim 1, wherein said polymer scale preventive agent contains an organic compound having at least 10 conjugated π-bonds and having a molecular weight of at least 1,000.

3. The process according to claim 2, wherein said organic compound having the conjugated π-bonds is selected from the group consisting of a condensation products of an aldehyde compound with an aromatic hydroxyl compound, a condensation product of pyrogallol with acetone, a polyhydric phenol self-condensation product, a polyhydric naphthol self-condensation product, an aromatic amine compound self-condensation product, a condensation product of aromatic amine compound with a phenol compound, a condensation product of an aromatic amine compound with an aromatic nitro compound, a product obtained by making basic the condensation product of an aromatic amine compound with an aromatic nitro compound by the use of an alkali metal salt or ammonium compound, a condensation product of quinone compound with an aromatic hydroxyl compound, a condensation product of quinone compound with an aromatic amine compound, and a condensation product of quinone compound with an aromatic hydroxyl compound and an aromatic amine compound.

4. The process according to claim 2, wherein said polymer scale preventive agent is further selected from the group consisting of an inorganic colloid, a silicate of an alkali metal, and a water-soluble polymeric compound.

* * * * *